April 21, 1942.   W. A. RAY   2,280,353
TEMPERATURE CONTROL SYSTEM
Filed Feb. 20, 1940
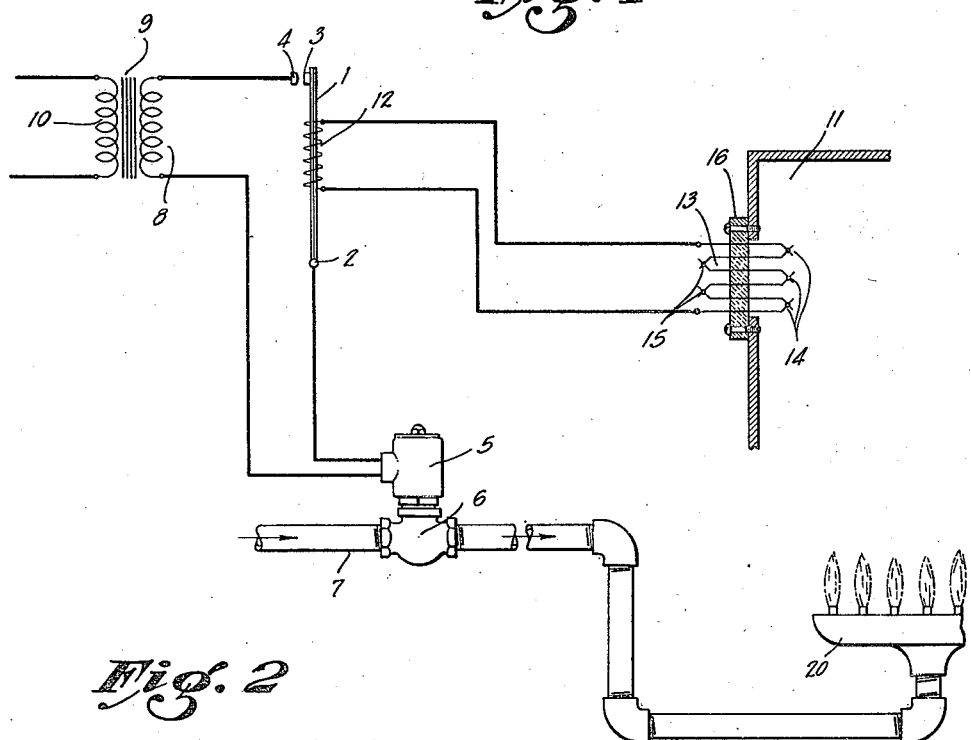
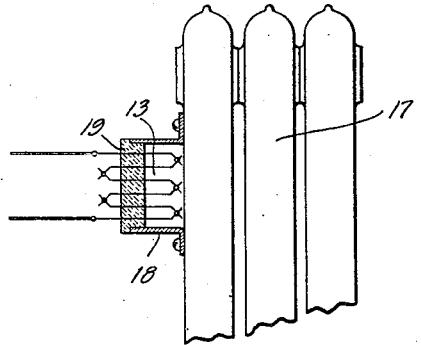
WILLIAM A. RAY,
Inventor;
By John Flam
Attorney.

Patented Apr. 21, 1942

2,280,353

UNITED STATES PATENT OFFICE 2,280,353

TEMPERATURE CONTROL SYSTEM

William A. Ray, Glendale, Calif.

Application February 20, 1940, Serial No. 319,894

9 Claims. (Cl. 236—9)

This invention relates to the control of temperature, as for example in a room or auditorium or the like.

Usually, the control is effected by the aid of a thermostat arranged to cause a heating unit (such as a gas or oil furnace or an electric heater) to become active when the temperature at the thermostat is below a predetermined value; and to render the heating unit inactive or to have its degree of activity reduced, when the temperature at the thermostat is above a predetermined value.

In such systems it is common to encounter a lag in the response of room temperature, especially when it is necessary to shut down the furnace to reduce the temperature. Such a reduction is apt to be delayed, due to the inherent lag in the thermostat response, or perhaps to the further dissipation of heat from the source even after the flame is extinguished, or the heating current turned off.

It is one of the objects of this invention to make it possible to anticipate the effect of the heat source, and to shut down the source even before the thermostat would otherwise respond.

It is another object of this invention to provide a system of simple and inexpensive character for accomplishing these results.

In order to secure these effects, the thermostat is arranged to be subjected to a supplementary, minor source of heat, that causes it to respond more rapidly to a temperature rise, and yet that is ineffective when the room or other space is no longer receiving heat.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 is a diagrammatic representation of a system incorporating the invention; and Fig. 2 is a fragmentary view of a modified form of the invention.

A thermostat structure 1 is indicated, which may be in the form of a strip of bimetal. As is well understood, variations in temperature to which the thermostat 1 is subjected will cause the bimetal strip to flex in one or the other direction with relation to a stationary anchor, such as that indicated at 2. The thermostat structure 1 is intended to be located in a space, the temperature of which is to be controlled, such as a room, auditorium or the like.

The thermostat structure carries a contact button 3 adapted to cooperate with a corresponding contact point 4. When the strip 1 flexes in response to a lowering of the temperature to a definite lower limit, the contact 3 engages the contact 4, and a control circuit is operated whereby a source of heat will be actuated or supplied with an increased amount of fuel. For example, this circuit may include a solenoid operated valve 6 having a solenoid structure 5 for operating it. This valve 6 is shown as included in a conduit 7 leading to a burner 20. The fuel supplied to the burner may be liquid or gaseous.

The control circuit is fed from the secondary winding 8 of a step-down control transformer 9. The primary winding 10 of this step-down transformer 9 may be appropriately connected to an ordinary commercial lighting circuit.

The source of heat in the form of the invention illustrated in Fig. 1, may be such as to produce a flow of heated air in a hot air duct or furnace bonnet 11. From this duct, heated air may pass into the space to be controlled. The heated air supplied to the space has a temperature considerably higher than the temperature which is to be maintained in the space. For example, ordinarily the thermostat 1 may be so adjusted that it will make and break the control circuit contacts upon a variation of a few degrees, neighboring 70° F. Nevertheless the heated air at its entry into the room has a temperature considerably above that desired.

In actual operation it is desirable to cause the thermostat 1 to operate to reduce the heating, slightly in advance of the attainment of its higher limit of temperature. If this be not done it is found that the room temperature may continue to increase before the rise is checked.

In order to ensure against such effects, the bimetal strip 1 is supplementarily heated by heat derived directly or indirectly from the furnace. In the present instance, the strip 1 is shown as having a supplemental heating means 12 in the form of a heating coil, disposed in good heat conducting relation to the bimetal strip. The heating effect of this coil is quite small; and the coil is so arranged that it is effective only while hot air is passing into the space. In order to accomplish this result, the heating coil 12 is shown as connected to a thermopile 13. The hot junctions 14 of this thermopile are shown as inserted in the hot air duct 11. The cold junctions 15 are outside of the hot air duct, and are shielded from the heat as by the aid of the vitreous insulation support 16. This insulation support forms a cover for an aperture in the wall of duct 11. The member 16 also serves conveniently as a support for the conductors forming the thermopile junctions. It is well understood that when conductors of dissimilar metals are thus joined in an alternate series, a difference in temperature between the hot and cold junctions will create a current. While this current is quite small, it is yet sufficient to operate to a desired degree, the supplemental or auxiliary heating means 12. In this way, the amount of supplemental heating varies with the temperature within duct 11. If this temperature is high, the current supplied to coil 12 will be larger and the heating effect greater than if the temperature within the duct was lower. This provides an earlier response of the thermostat to check the heat, when heat is being supplied to the space at a rapid rate, and thereby ensures better regulation of the temperature of the space.

When the furnace is shut down by operation of the thermostat structure 1 to open the control circuit, the air in duct 11 gradually cools and the thermopile structure 13 becomes ineffective. Accordingly it is only when additional heat is applied to the space to be controlled that there is any generation of current for creation of heat by the heating unit or coil 12.

The thermopile structure 13 may be generally placed at a location neighboring an elevated temperature due to the source of heat. In the form of Fig. 1 this is accomplished by placing the hot junctions of the thermopile within a stream of heated air. In the event that the source of heat operates to heat a radiator 17, the thermopile 13 may be arranged in an enclosure 18 so as to have the hot junctions placed quite close to one of the radiator leaves. The cold junctions as before, extend on the opposite side of the vitreous insulation support 19, through which the thermopile conductors pass. This support 19 serves also as a cover for the enclosure 18.

What is claimed is:
1. In a system for controlling a source of heat, a thermostat movable to a position for causing the source to operate, and subjected to the temperature changes in a space, and supplemental heating means for the thermostat adapted to heat the thermostat to an extent dependent on the temperature of said source, comprising a thermopile affected by the source of heat.

2. In a system for controlling a source of heat, a thermostat movable to a position for causing the source to operate, and acting in response to temperature rise of the thermostat, and supplemental heating means for the thermostat adapted to heat the thermostat to an extent dependent on the temperature of said source, comprising a thermocouple having hot and cold junctions, and having the hot junctions adapted to be located in a space subjected to a temperature elevated by the source of heat above the temperature of the space neighboring the thermostat.

3. In a system for controlling a source of heat adapted to transmit heat into a space by elevation of temperature above the desired temperature in the space, a thermostat in the space and adapted, between confined limits of temperature attained by the thermostat, to reduce the activity of the source when the higher limit is attained, and to increase the activity of the source when the lower limit is attained, and supplemental means for affecting the thermostat adapted to heat the thermostat to an extent dependent on the temperaure of said source, comprising a thermopile having hot and cold junctions, the hot junctions being subjected to a region having a temperature elevated by aid of the source above the temperature of the space neighboring the thermostat.

4. In a system for controlling a fuel burning furnace adapted to heat a space, a thermostat in the space and adapted, between confined limits of temperature attained by the thermostat, to reduce the supply of fuel to the furnace when the higher limit is attained, and to increase the supply of fuel to the furnace when the lower limit is attained, and supplemental means for elevating the temperature of the thermostat adapted to heat the thermostat to an extent dependent on the temperature of said source, comprising a thermopile affected by the heat produced by the furnace.

5. In a system for controlling a fuel burning furnace adapted to heat a space, a thermostat in the space and adapted, between confined limits of temperature attained by the thermostat, to reduce the supply of fuel to the furnace when the higher limit is attained, and to increase the supply of fuel to the furnace when the lower limit is attained, and supplemental means for elevating the temperature of the thermostat adapted to heat the thermostat to an extent dependent on the temperature of said source, comprising a thermopile having hot and cold junctions, the hot junctions being affected by the heat produced by the furnace.

6. In a system for controlling a fuel burning furnace adapted to heat a space, a thermostat in the space and adapted, between confined limits of temperature attained by the thermostat, to reduce the supply of fuel to the furnace when the higher limit is attained, and to increase the supply of fuel to the furnace when the lower limit is attained, and supplemental means for elevating the temperature of the thermostat adapted to heat the thermostat to an extent dependent on the temperature of said source, comprising a thermopile having hot and cold junctions, the hot junctions being located in a region where the temperature is elevated by the heat produced by the furnace, above that existing at the space neighboring the thermostat.

7. In a system for controlling a fuel burning furnace having a hot air duct for transmitting heat to a space, a thermostat in the space and adapted between confined limits of temperature attained by the thermostat, to reduce the supply of fuel to the furnace when the higher limit is attained, and to increase the supply of fuel to the furnace when the lower limit is attained, and supplemental means for elevating the temperature of the thermostat adapted to heat the thermostat to an extent dependent on the temperature of said source, comprising a thermopile having hot and cold junctions, the hot junctions being subjected to the elevated temperature in the hot air duct.

8. In a system for controlling a fuel burning furnace supplying heat to one or more radiators for heating a space, a thermostat in the space and adapted between confined limits of temperature attained by the thermostat, to reduce the supply of fuel to the furnace when the higher limit is attained, and to increase the supply of fuel to the furnace when the lower limit is attained, and supplemental means for elevating the temperature of the thermostat adapted to heat the thermostat to an extent dependent on the temperature of said source, comprising a thermopile having hot and cold junctions, the hot junctions being located adjacent the radiator to be subjected to an elevated temperature above that of the cold junctions.

9. In a system for controlling a source of heat utilized to heat a fluid medium, a thermostat movable to a position for causing an increased activity of the source, as well as to another position for causing a reduced activity of the source, said thermostat being subjected to the temperature changes in a space heated by aid of said medium so that an increase in the said temperature of sufficient amount tends to move the thermostat to the position corresponding to a reduced activity of the source, supplemental heating means for the thermostat, for assisting the thermostat to move to the position corresponding to a reduced activity of the source, and means for supplying heat to said supplemental heating means, continuously while said heating means is active, the supplemental heating being so constructed and arranged that the intensity of the heat produced by said supplemental heating means is dependent upon the intensity of the heat of said medium.

WILLIAM A. RAY.